April 7, 1936.  H. M. TURNER  2,036,896
WELDING SYSTEM
Filed May 19, 1932  2 Sheets-Sheet 1

INVENTOR.
HUBERT M. TURNER
BY John P. Tarbox
ATTORNEY.

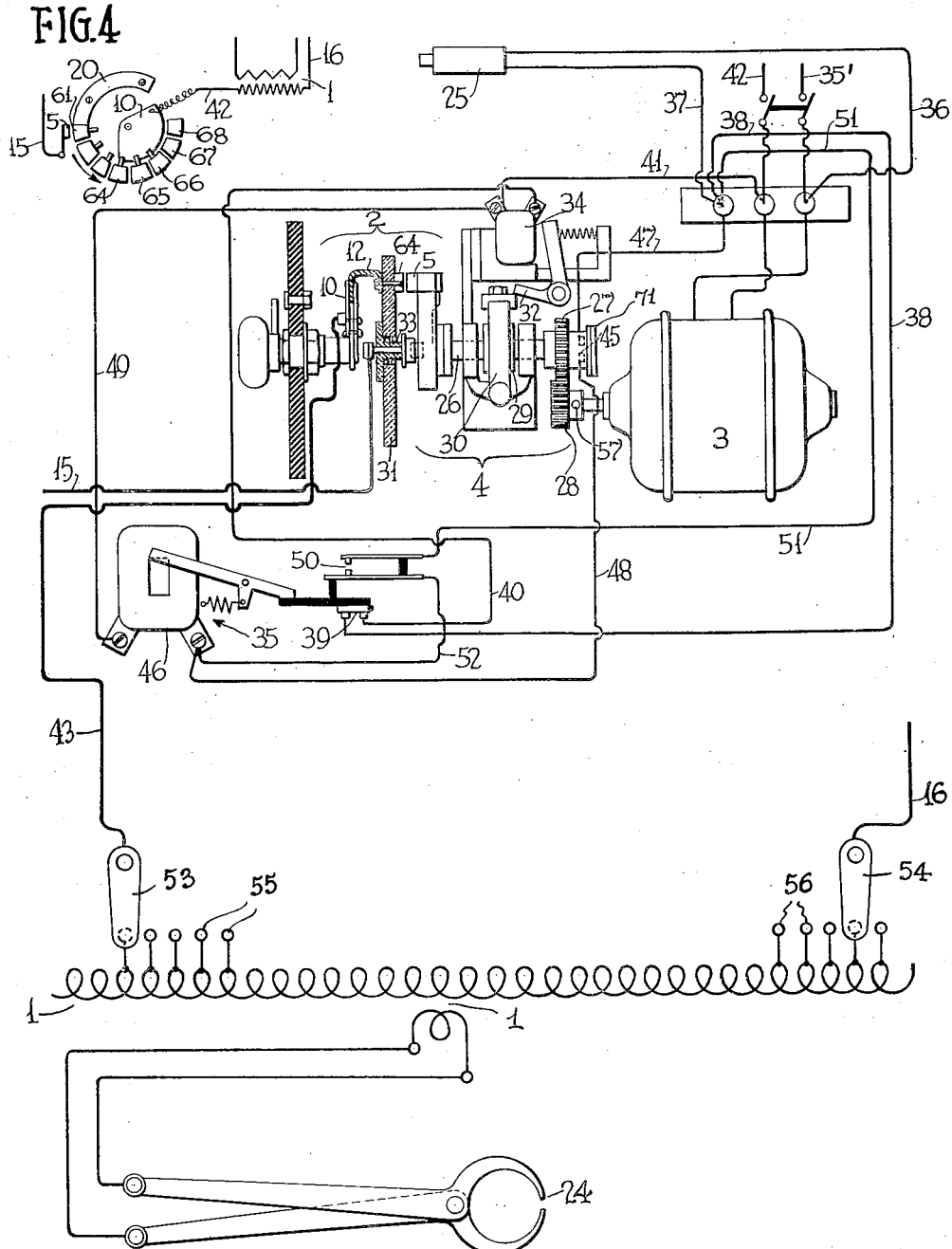

Patented Apr. 7, 1936

2,036,896

UNITED STATES PATENT OFFICE 2,036,896

WELDING SYSTEM

Hubert M. Turner, New Haven, Conn., assignor to Edward G. Budd Manufacturing Company, Philadelphia, Pa., a corporation of Pennsylvania Application May 19, 1932, Serial No. 612,196

2 Claims. (Cl. 219—4)

The present invention has reference to alternating current resistance welding and relates more particularly to a system and method of control of alternating current in spot welding.

Its chief object is the provision of a system and method for controlling the application of alternating current of relatively high density to a welding unit for extremely short periods of time and with extreme accuracy and substantial elimination of arcing.

Another object of the invention is to overcome lack of uniformity in short time welds, especially heretofore encountered where the duration of current supply is so short in proportion to the frequency as to result in substantial variation in power supplied to welds of the same time interval, according to the portion or portions of the current cycle with which such intervals coincide.

The objects of my invention are achieved by the provision of special synchronously operated circuit making and breaking means operable to always effect the break at a zero point in the current cycle and to effect the closing of the circuit at different predetermined points of time in lead of said zero point according to the duration of current application desired. The result of this breaking at the zero point is two-fold in that the reduction or substantial elimination of the arc at breaking, in turn acts to prevent such continuation of current flow at reduced volume as would take place after separation of the contacts through the drawing of an arc, a very important feature where accurately timed, extremely brief periods of current flow are essential.

Other objects and advantages of the invention will be apparent from a perusal of the following specification and the drawings accompanying the same.

In the drawings:

Fig. 3 is a more detailed diagram of the circuits and apparatus constituting a preferred embodiment of the invention, especially applicable to spot welding.

Fig. 4 is a diagram of the timing adjustment.

Figures 1, 2:
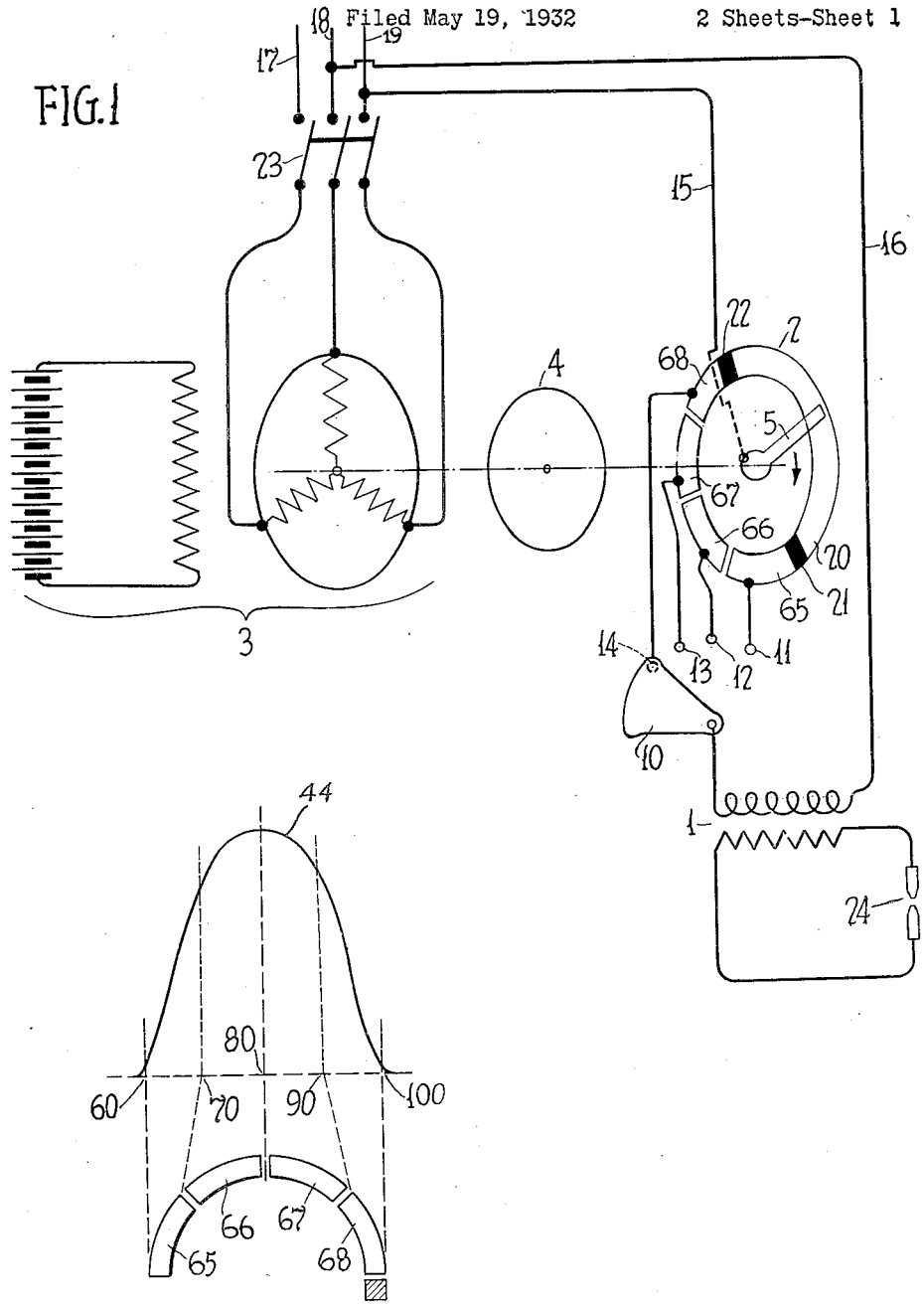
Fig. 1 is a schematic diagram of a welding system embodying the invention.
Fig. 2 is a diagram showing the relation of the current phase to the position of the brush on the stationary contacts of the commutator.

Referring to the drawings in detail and first to the schematic diagram of Fig. 1, the main elements are here shown as comprising the welding transformer 1, a rotary switch device 2, a synchronous motor 3 and suitable coupling means 4 between the motor and switch functioning as a one-revolution-and-stop device and may be any form of mechanism, mechanical or electrical, operable upon each actuation to produce one operative revolution of the switch. Such a control device will be described more in detail hereinafter in connection with Fig. 3, but it suffices for the present to consider the element 4 as any suitable clutch arrangement with synchronized control means for effecting the connection and disconnection of the clutch at a predetermined point or points in the current cycle and operable upon each actuation to cause only one complete actuation of the switch 2.

The switch 2 comprises a rotary brush 5 arranged to sweep over a series of contacts 65 to 68 in a direction as indicated by the adjacent arrow, the brush being arranged in such angular relation to the motor shaft, through the one-revolution-and-stop device 4, as to always leave the last contact 68 at a zero point in the current cycle and to start from and stop in a position out of engagement with any of the series of contacts.

A bridging brush 10 is arranged to connect one or more of the contacts 65 to 68 with one terminal of the primary of the welding transformer through the extension terminals 11 to 14 of the contacts 65 to 68, respectively, the bridging brush being arranged to connect any number of successive contacts together beginning with 68 and running back to 65 so as to change the time at which the circuit is made to different points in advance of a given zero point in the current cycle. The arrangement thus operates to effectively lengthen the last stationary contact in a direction backwardly from the break end.

The brush 5 and the other terminal of the transformer primary winding are connected over conductors 15 and 16 to the two line wires 18 and 19, respectively, of the 3 phase line 17—18—19.

The series of contacts 65 to 68 are arranged in an arc of such length as to leave sufficient space between the last contact 68 and the first contact to permit the brush 5 to move a sufficient distance from the last contact to produce an effective break in the circuit and to allow an appreciable amount of movement before it again engages the first of the series of contacts. To this end, the series of contacts are arranged to occupy approximately half of the path swept over by the brush, the other approximate half being occupied by a portion 20 insulated at each end by suitable insulating space members 21 and 22.

A synchronous motor 3 is connected to the line

17—18—19 through a suitable three-pole single throw switch 23.

In the present instance it is assumed for the sake of clearness that the switch is so geared to the motor 3 as to cause the brush to sweep over the entire series of four contacts from end to end in half a current cycle, which establishes the relation of the current cycle and the position of the brush as indicated in diagram, Fig. 2. For example, a motor of 1200 R. P. M. connected to the brush with a step-up gearing of one to three will give a brush speed of 3600 R. P. M. or 60 revolutions per second, which would give the desired condition on a 60 cycle current.

In operation, assuming the parts to be in the position shown in Fig. 1, and the device 4 so arranged and synchronously controlled as to always start the switch arm from a given position, for example, that shown, and at a time co-incident with a given point in the current cycle such that the arm after sweeping over the series of contacts will leaves the last contact 68 at a zero point in the cycle, the welding electrodes 24 are applied to the work in the usual manner and the control device 4 operated to effect the single effective operation of the switch 2. The switch arm 5 thereupon sweeps over the series of contacts 65 to 68, leaving the last contact 68 at a zero point in the current cycle. In this operation of the switch the transformer circuit is not closed until the brush 5 engages the leading edge of the contact 68 because this is the only contact connected to the primary circuit of the transformer through the bridging brush 10. The circuit thus closed may be traced from line wire 18, over conductor 16, through primary winding of the transformer 1, bridging brush 10, extension contact 14, switch contact 68, brush 5 and back over conductor 15 to line wire 19. This circuit remains closed until the brush 5 leaves the contact 68 whereupon the circuit is opened, the opening occurring at a point of time co-incident with a zero point in the current cycle as will be clear upon reference to Fig. 2.

In Fig. 2, which shows schematically the relation of the current cycle to the movement of the brush over the series of contacts in a half revolution, one-half cycle of the current curve is indicated at 44 while the points of time corresponding to the times of arrival of the brush at the beginning of each of the contacts 65 to 68 and the point of time at which the brush leaves the last contact 68, are indicated at 60, 70, 80, 90 and 100, respectively. From this it will be clear that in the operation just described, the brush arriving at the leading edge of contact 68 closes the circuit at the point 90 in the current cycle and opens it at the zero point 100. Where a longer time and a greater amount of energy are desired, two or more of the extension contacts 11 to 14 may be connected, counting back from the last bridging contact 14, according to the amount of energy required. For example, if contacts 67 and 68 are connected the circuit will be closed at the point 80 and opened at 100 giving a full quarter cycle, and if all four contacts are connected the circuit will be closed at the point 60 giving a full half cycle. Because the circuit is broken substantially at zero in each instance, there is substantially no arc thus eliminating any irregular continuation of current flow due to the drawing of an arc as would be the case were the circuit broken at a higher point in the curve of the current cycle.

A preferred practical application of the invention is shown in Figs. 3 and 4, where elements of similar function to the elements indicated in Fig. 1 are indicated by similar reference characters. Here the one-revolution-and-stop device 4 is that disclosed in the application of Earl J. W. Ragsdale, Serial No. 558,520 filed August 20, 1931 for Welding machine. The motor 3 is a synchronous motor serving the same function as the motor of Fig. 1, but in the present instance is a single phase synchronous motor. As in Fig. 1, the motor is connected to the rotary switch through the control mechanism 4 which operates upon each actuation to effect a single operation of the switching device 2. The brush 5 is mounted on a driving shaft 26 geared to the motor 3 through the gears 27 and 28 carried by the driving shaft 26 and the motor shaft, respectively. In the present instance the gearing from motor to brush is one to two, so that the brush is given twice the speed of the motor and thus includes several zero points of the current cycle in one revolution, but is so set on the shaft as to always leave the last switching contact substantially at a zero point in the current cycle. The brush shaft 26 also carries fixed thereto a cylindrical cam member 29 which co-operates with an oscillating yoke 30 to oscillate the latter to and from the contact block 31 in each rotation of the shaft, the parts being so proportioned and arranged that when the yoke 30 is held stationary by a suitable detent 32 the yoke will act as an abutment for the cam and cause the shaft 26 to be moved toward the contact block 31 carrying with it the brush 5 into engagement with the contacts of which in the present embodiment there are 8 (Fig. 4), numbered 61 to 68 only one of such contacts, 64 is shown in Fig. 3. The cam 29 is so shaped in relation to the angular position of the series of contacts 61 to 68 as to force the brush 5 into the plane of the contacts just before it reaches the first of the series of contacts and to hold it in engagement with the contacts until after it has passed the last contact in the series.

The brush 5 and its driving shaft 26 are held over to the right to normally space the brush away from the contacts as shown by means of a compression spring 33. Thus the switch 5 is continuously rotated by the motor 3 in synchronism with the current cycle but out of operative relation with the series of stationary contacts (Fig. 4) until and unless the detent is moved into the path of the oscillating yoke 30 to restrain the latter from movement. The movable detent 32 is normally held out of engagement with the yoke 30 and is arranged to be thrown into engagement and so held by electro-magnet 34, which electro-magnet is arranged to be controlled through a locking relay 35 and push button 25 to bring about one operative actuation of the mechanism 4 upon each operation of the push button in a manner which together with a further detailed description of the functions of the various elements will be brought out in the following description of operation.

The operation of the apparatus is for the purpose of controlling the effective energization of a circuit, for example, a welding circuit. This welding circuit includes the secondary circuit of the welding transformer 1 and its welding electrodes 24 and the primary circuit in which it is preferable to locate the timing device. The primary circuit comprises the following extending from one power line through a suitable switch: the lead 16, switch 54, taps 56, taps 55, switch 53, conductor 43, the adjusting contact 10, extension contacts 12, the relatively movable timing contacts 5 and 64 and the conductor 15 to another suitable switch and the other terminal of a power supply. These power supply terminals may be to the terminals 42 and 35', although it is preferable to use a higher voltage power supply for the welding transformer primary circuit and a lower voltage at the points 42 and 35' so that the control apparatus will not be essentially hazardous when in use. The two parts of the primary of the welding transformer are also included in this welding circuit and are wound in a proper manner so that they do not buck each other.

In operation, assuming the parts to be in the position indicated and the welding tongs 24 applied to the work in the usual manner, the push button 25 is actuated closing a circuit which may be traced from line wire 35', over conductor 36, through push button 25, and thence over conductor 37, conductor 38, contacts 39 of lock-out relay 35, conductor 40, magnet 34, conductor 41 and back over line wire 42.

Energization of the magnet 34 causes the detent 32 to swing into the path of the oscillating yoke 30, either immediately if the yoke is at the end of its left-hand swing or after an extremely short interval upon the first succeeding left-hand swing of the yoke. The parts are so related that the yoke 30 swings back into engagement with the detent 32 just before the brush 5 arrives over the first contact in the series, with the result that the yoke 30 acting as an abutment for the cam 29 causes the shaft 26 and brush 5 to move to the left into the plane of the contacts so that in its continued movement it will sweep over the same in electrical connection therewith until after it passes the last contact.

Thus, as the brush 5 sweeps over the stationary contacts the circuit through the primary coil of the transformer is not closed until the brush reaches contact 64 (Fig. 4) whereupon the circuit is closed over a path which may be traced from line conductor 15, brush 5, contact 64, extension terminal 12, bridging brush 10, conductor 43, primary of transformer 1, and back over line wire 16. When the brush leaves the last contact 68, which occurs at a point of time coinciding with a zero point in the current cycle, the circuit just traced is opened.

A suitable bridging contact, not shown, carried by the commutating disc 71, which is carried and fixed on shaft 26, is arranged on the commutator disc in such angular relation to a pair of stationary contacts 45 as to bridge the same just after the switch 5 leaves the last contact 68, whereupon the relay 35 is energized to open the circuit previously traced through magnet 34 and close a locking circuit for itself through the push button 25.

The energizing circuit of the magnet 46 of the relay 35 may be traced over the line wire 35', conductor 36, push button 25, conductor 37, conductor 47, contacts 45, conductor 48, relay magnet 46, conductor 49, conductor 41, and back over line wire 42.

The armature of relay 35 moving upwardly opens the contact 39 and closes a locking circuit for itself through contacts 50, which locking circuit may be traced from line wire 35' over conductor 36, push button 25, conductor 37, conductor 51, contacts 50, conductor 52, magnet 46, conductor 49, conductor 41, and back over line wire 42. As this locking circuit passes through the push button 25 the locking relay 35 is held energized maintaining the energizing circuit of magnet 34 open until the push button 25 has been released, thus preventing a repeated operation of the switch mechanism until after the push button has been released and again actuated. Due to the high speed of rotation of the switch shaft 26 and consequently the high speed of actuation of the contacts 45, the sequence of operation thus takes place in an extremely brief time interval less than that in which it would be possible for the operator to actuate and release the push button 25. The de-energization of the magnet 34 allows the detent 32 to move out of the path of the yoke 30 thus permitting the yoke to oscillate freely and the brush 5 to be held spaced away from the stationary contacts under tension of the compression spring 33, as shown in Fig. 3 so that in the continued rotation of the brush 5 the latter remains out of engagement with the stationary contacts.

In practice it is of course desirable to vary the transformer capacity as by variation of the number of active turns in the transformer primary. Means for such adjustment is here shown in the form of a pair of switch arms 53 and 54 co-operating with tap terminals 55 and 56 for adjusting the number of effective turns in a manner which will be obvious. Where the current load is thus changed or other adjustments are made which tend to vary the phase relation between the current and the motor 3 and that in the welding circuit, a suitable angular adjustment between the shaft of the motor and the brush 5 is made to bring the time of the break at the end of the series of contacts into coincidence with a zero point in the current cycle. This may be done by releasing the connection between the gear 28 and the motor shaft as by backing out the set screw 57, moving the brush forward or backward as the condition may require, and again tightening the set screw.

While I have thus shown and described certain specific embodiments of the invention, for the sake of disclosure, it is to be understood that the invention is not limited to such specific embodiments but contemplates all such modifications and variants thereof as fall fairly within the scope of the appended claims.

What I claim is:

1. An electric switch comprising relatively movable contact means for operatively energizing a circuit with current fluctuating to and from zero and for maintaining said circuit energized for an adjustable definite length of time, and for effectively de-energizing said circuit at a time when the instantaneous energy value is substantially zero, means for adjusting said time independently of the energizing means and while said apparatus is in operation and so arranged that the timed period will always start at a time so that the termination thereof will occur when the instantaneous energy is substantially zero, push button means for initiating the operation of the switch, electrical relay means energized by the operation of said push button means, and electrical relay means energized at the termination of the circuit energizing period and operating through said push button means to lock out said first-named relay means whereby to effect a single operation for each operation of said push button means.

2. A timing switch for electric circuits comprising relatively movable contacts arranged to effect the energization and de-energization of a circuit, push button means to initiate the operation of the switch, continuously rotating means for effecting the timed operation of said contacts, electro-magnetic actuator means whose operation is effected by the actuation of said push button means and arranged to effect the timed engagement of said contacts, means predetermining the timed period of engagement of said contacts and means having a locating circuit through said push button means limiting the energization of the circuit to one operative energization only for each actuation of said push button means and only so long as said push button is held closed, the apparatus arranged so that the start of said timed period will always occur at a time such that the termination of said timed period will always occur at a time when the instantaneous energy value in said circuit is substantially zero.

HUBERT M. TURNER.